US010975522B2

(12) United States Patent
Räsänen et al.

(10) Patent No.: US 10,975,522 B2
(45) Date of Patent: Apr. 13, 2021

(54) METHODS FOR MAKING PAPER OR BOARD, A BOARD TRAY AND PULP PARTICLES COATED WITH FOAMABLE POLYMER FOR USE IN THE SAME

(71) Applicant: Stora Enso OYJ, Helsinki (FI)

(72) Inventors: Jari Räsänen, Imatra (FI); Mari Hiltunen, Imatra (FI); Ali Harlin, Kerava (FI); Hanna Koskela, Espoo (FI); Christiane Laine, Espoo (FI); Laura Kela, Helsinki (FI)

(73) Assignee: Stora Enso OYJ, Helsinki (FI)

( * ) Notice: Subject to any disclaimer, the term of this patent is extended or adjusted under 35 U.S.C. 154(b) by 331 days.

(21) Appl. No.: 16/076,197

(22) PCT Filed: Feb. 6, 2017

(86) PCT No.: PCT/IB2017/050629
§ 371 (c)(1),
(2) Date: Aug. 7, 2018

(87) PCT Pub. No.: WO2017/137879
PCT Pub. Date: Aug. 17, 2017

(65) Prior Publication Data
US 2020/0308768 A1 Oct. 1, 2020

(30) Foreign Application Priority Data

Feb. 12, 2016 (SE) .................................... 1650183-5

(51) Int. Cl.
| *D21H 21/22* | (2006.01) |
| *D21F 11/00* | (2006.01) |
| *B31F 1/00* | (2006.01) |
| *B65D 1/34* | (2006.01) |
| *C08J 9/16* | (2006.01) |
| *C08J 9/228* | (2006.01) |
| *D21H 21/56* | (2006.01) |

(52) U.S. Cl.
CPC .......... *D21F 11/002* (2013.01); *B31F 1/0077* (2013.01); *B65D 1/34* (2013.01); *C08J 9/16* (2013.01); *C08J 9/228* (2013.01); *D21H 21/22* (2013.01); *D21H 21/56* (2013.01)

(58) Field of Classification Search
USPC ................... 162/101, 164.1, 168.1
See application file for complete search history.

(56) References Cited

U.S. PATENT DOCUMENTS

| 8,157,959 B2 * | 4/2012 | Rasanen ................ D21H 17/35 |
| | | 162/168.1 |
| 2010/0112247 A1 * | 5/2010 | Rasanen ................ D21H 17/00 |
| | | 428/34.2 |

FOREIGN PATENT DOCUMENTS

| EP | 1981630 | 10/2008 |
| GB | 1118221 | 6/1968 |
| GB | 1395757 | 5/1975 |
| JP | 3176539 | 3/1997 |
| JP | 2000086801 | 3/2000 |
| JP | 2000212319 | 8/2000 |
| JP | 2011069012 | 4/2011 |
| WO | 2008113887 | 9/2008 |
| WO | 2013140034 | 9/2013 |
| WO | 2013160553 | 10/2013 |
| WO | 2014080084 | 5/2014 |
| WO | 2015063643 | 5/2015 |

OTHER PUBLICATIONS

International Searching Authority, Written Opinion of the International Searching Authority, PCT/IB2017/050629, dated Apr. 27, 2017.
International Searching Authority, International Search Report, PCT/IB2017/050629, dated Apr. 27, 2017.

* cited by examiner

Primary Examiner — Mark Halpern
(74) Attorney, Agent, or Firm — Greer, Burns & Crain, Ltd.

(57) ABSTRACT

The invention concerns a method of manufacturing paper or board, the paper or board obtained by the method, and a method of producing a tray from the board. In a fibrous stock for papermaking is incorporated an amount of polymer coated fibrous particles, which even have a foaming agent such as moisture contained therein. A web is formed from the fibrous stock on a forming fabric of a paper or board machine, followed by pressing and drying to a finished paper or board. As the paper or board is sufficiently heated the foaming agent within the particles evaporates, causing expansion and foaming of the polymer coating, which adds to malleability of the board as it is moulded into a shaped article such as a board tray. The invention even covers production of doubly coated fibrous particles for use in said methods, the inner coating layer being of a foamable polymer with a higher melt flow rate and the outer coating layer being of a non-foaming polymer of a lower melt flow rate.

16 Claims, No Drawings

METHODS FOR MAKING PAPER OR BOARD, A BOARD TRAY AND PULP PARTICLES COATED WITH FOAMABLE POLYMER FOR USE IN THE SAME

This application is a U.S. National Stage under 35 U.S.C. § 371 of International Application No. PCT/IB2017/050629, filed Feb. 6, 2017, which claims priority to Swedish Patent application no. 1650183-5, filed Feb. 12, 2016.

BACKGROUND OF THE INVENTION

The invention concerns a method of manufacturing paper or board, as well as the paper or board obtainable thereby. Furthermore, the invention includes a method of manufacturing a board article, such as a plate or tray, and a method of producing polymer coated particles to be used for making the paper or board.

Production of fibrous board articles such as plates, trays and the like containers comprises a deep drawing or vacuum moulding step by use of a mould having a recess or cavity corresponding to the shape of the article. Usually the procedure generates wrinkles or corrugations in the corners of a rectangular article or along the entire periphery when the article has a rounded, usually circular or oval shape. However, various techniques have been developed to diminish or avoid wrinkling and improve mouldability of the board used for the articles.

Known approaches for avoiding wrinkling include a multistep moulding technique producing stepped side walls of a tray as described in WO 2013/140034 A1, and moulding tools specifically designed to allow free forming of the tray side walls as described in WO 2015/063643 A1.

A different approach is increasing malleability of the board used for moulded articles such as trays. For the purpose there exists a multilayer board having a polymer layer sandwiched between two fibrous board layers. The intermediate polymer layer is aimed to improve mouldability of the multilayer board by allowing the two board layers to slide in relation to each other at the moulding step. However, such mouldability is rather limited while the manufacturing cost of the multilayer material is high.

WO 2014/080084 proposes foam forming of a fibrous web, which is impregnated with polymer and can be turned to moulded articles. The foam-formed polymer-impregnated material is said to have improved elongation particularly in thermoformation. However, subjecting the web to subsequent impregnation impractically burdens the process with an additional working step.

In WO 2008/113887 there is described a specific technique for preventing a hot drink enjoyed from a disposable board cup from burning the fingers of the user. The teaching is to dope the fibre-based stock used for making the board with a polymer such as low density polyethylene (LDPE), which ends up in the dried board produced in the board machine. When the board is heated, the polymer melts and water vapour bubbles penetrate it, rendering the board porous. Pore-generating heating can be applied to the board or first to the cup made from it. The gas-filled pores work as a heat insulation between the fingers and the hot liquid in the cup.

SUMMARY OF THE INVENTION

With the above described prior art as a background, the problem addressed by the present invention is to develop an improved technique for moulding plates, trays and the like containers, which is based on a novel constitution of the fibrous paper or board. According to the invention the paper or board is produced by a method, which comprises the steps of:

(i) coating pulp fibres and a foaming agent with a foamable polymer, to produce polymer-coated foamable particles, (ii) incorporating an amount of said particles into a fibrous stock for papermaking, (iii) forming a web from said fibrous stock on a forming fabric of a paper or board machine, (iv) pressing and drying said web to a paper or board layer, and (v) heating said paper or board layer to have the foaming agent contained in the particles to produce vapour or gas, which foams said polymer.

The finding of the present inventors is that foaming the particles from the inside produces a considerable expansion of the same and, preferably, brings the particles into contact with each other, which brings about a major increase to the plasticity and mouldability of the fibrous layer. In this respect such a layer is quite comparable to the intermediate polymer layer of the known multilayer board as discussed above. As the layer according to the invention can be produced by usual papermaking techniques in a paper or board machine, it is much cheaper to produce than the separate polymer layer of the prior art, and can be combined with conventional (all-fiber) fibrous layers into a multilayer board by standard manufacturing techniques.

The foamable particles being fibre-based brings the further advantage that the share of biorenewable fibrous material in the mouldable layer and in the product in general is high. The particles may be very thinly polymer-coated, i.e. amount of polymer in the particles may be low as compared to the fibres, while the particles still have a large expansion and joining capacity when evenly dispersed in the mouldable layer.

Preferably the foaming agent is water, i.e. moisture contained in the cellulosic fibres, which evaporates and foams the polymer. The advantage is the capacity of the cellulosic fibres to hold or bind a large amount of water to produce foaming.

Alternatively the foaming agent may be another volatile liquid or a chemical, which decomposes and liberates gas when heated. For instance solids such as sodium bicarbonate or azodicarbonamide, which release gaseous carbon dioxide upon heating, can be used in combination with humid or dry cellulosic fibres.

As compared to WO 2008/113887 the essential novelty of the invention is the combination of fibres and the foaming agent, preferably humid fibres, within the particles, to let the humidity evaporate and foam and expand the particles from their inside, as opposed to the reference in which foaming of the doped polymer particles is dependent on moisture coming from the outside. Thereby expansion of the particles is more extensive, and non-foaming polymer coating layers are not needed to block the board surfaces to prevent premature escape of the moisture that is needed for foaming. Instead of moulding WO 2008/113887 describes making the drinking cups from board blanks by bending and sealing, without aiming at or making any mention of improving moldability by means of doped polymer particles embedded in the board.

To secure easy foamability at heating the melt flow rate of the foamable polymer is preferably at least about 15 g/10 min at 190° C. A suitable foamable polymer for use in the invention is low density polyethylene (LDPE).

According to an advantageous embodiment of the invention at said first step (i) the particles are provided with a double-layer coating, specifically designed so that the melt flow rate of the foamable polymer of the inner layer is higher than the melt flow rate of the polymer of the outer layer, and at said final step (v) the polymer of the inner layer is foamed by means of the enclosed foaming agent while the polymer of the outer layer remains substantially unfoamed. An unfoamed thin outer layer is able to stretch according to expansion of the foaming inner layer, while making a barrier to escape of vapour or gas needed to produce and uphold the foam.

The fibres enclosed in the particles may have a length of 1 to 50 mm. The share of polymer in said particles may vary in the range of 5 to 65 wt-%. The particles generally have the shape of elongate drops with an aspect ratio from about 1:2 to 1:10. However, the particles may even be yarns having a plurality of fibres isolated from each other by the polymer. Such particles can be produced by extrusion of a melted blend of fibres and polymer. The resulting yarn may then be cut into pieces suitable for incorporation in a fibrous stock for papermaking.

In a further embodiment the particles may be unbroken fibre yarns sufficiently humid and coated with a foamable polymer, and having an aspect ratio up to 1:100 or even up to 1:3000. The benefit of such elongate yarn-like particles is that they support the fibre network as the board is moulded into an article.

The share of the foamable and expandable particles in the paper or board layer may vary within the range of 5 to 25 wt-%. Preferably the amount of particles is sufficient to bring at least part of the particles into contact with the neighbouring ones as they are foamed and expanded.

The particles may be added to the fibrous stock at a headbox of the paper or board machine, preferably by mixing the particles with liquid circulated in the process so as to form 5 to 25% of the dry weight of the stock supplied onto the forming fabric. Commercial flash mixing (Trump-jet) technique is useful for carrying out the mixing and supplying the mixture to the stock.

According to a preferred embodiment of the invention the particles are incorporated in a middle layer of a multilayer board. The adjacent layers sandwiching such a middle layer may be usual all-fibre paper or board layers, and conventional outermost polymer coating layers may be present for barrier and heat-sealing purposes if necessary.

The temperature at said step (v) to bring about foaming in the particles may be about 110 to 200° C., preferably about 115 to 125° C. The latter narrower range would be suitable to evaporate moisture and melt and foam an inner coating layer of LDPE while leaving an outer coating layer of polypropene (PP) with a lower melt flow rate unfoamed but stretching according to the expansion of the inner layer.

Generally it is preferred that the paper or board is provided with an extruded polymer coating layer on both sides thereof before the heating, which induces foaming in the particles incorporated in the stock. If the particles have a single layer coating only, the polymer used for coating the paper or board preferably has a lower melt flow rate than the polymer coating of the particles. In case of doubly coated particles this feature is less important. Conventional LDPE can be used for the extruded coating layers to secure easy heat-sealability.

Foaming of the polymer may be carried out before the newly produced paper or board is reeled. Alternatively the foaming may take place first as the board is moulded into an article, or only the ready-moulded article is subjected to foaming.

Paper or board obtainable by use of the method according to the invention is characterized in that at least one fibrous layer thereof contains foamed polymer enclosing wood pulp fibres.

The method according to the invention for manufacturing a board article such as a plate or a tray from board produced as described above comprises the steps of
(i) placing the board over a mould, which has a recess shaped to accord with the article being produced,
(ii) drawing the board against the mould by means of vacuum,
(iii) during step (ii), heating the board to induce foaming in the polymer-coated particles incorporated in the board, and
(iv) cooling the newly moulded article to solidify the foamed polymer within the board.

The method according to the invention for producing polymer coated particles for use in making the paper or board comprises the steps of
(i) suspending fibrous cellulosic particles of a length of 1 to 50 mm in a solution containing a foamable first thermoplastic polymer and a first solvent,
(ii) precipitating said first thermoplastic polymer onto said fibrous particles by means of added water and phase inversion, to obtain fibrous particles with enclosed humidity and a first polymer coating layer,
(iii) suspending the polymer-coated particles obtained at step (ii) in a solution containing a second thermoplastic polymer and a second solvent, said second thermoplastic polymer having a melt flow rate lower than the melt flow rate of said first thermoplastic polymer, and
(iv) precipitating said second thermoplastic polymer onto said fibrous particles by means of added water and phase inversion, to obtain fibrous particles with a double-layer polymer coating, in which the inner first polymer coating layer is foamable while an outer second polymer coating layer remains unfoamed.

DETAILED DESCRIPTION

Polymer Coated Particles

To produce polymer coated fibrous particles cellulosic fibres or bunches of such fibres of a length of 1 to 50 mm, preferably 1 to 5 mm, are suspended in a solution containing a foamable thermoplastic polymer and an organic solvent. The fibres can be of chemical pulp, chemithermomechanical pulp (CTMP), thermomechanical pulp (TMP) or the like, produced from birch, pine, spruce, aspen, eucalyptus etc. A preferred polymer for the purpose is LDPE with a melt flow rate of about 15 g/10 min at 190° C. or more, and a preferred solvent is decalin. Water is then added to the solution to bring about a phase inversion and precipitation of the polymer onto the cellulosic fibres. Drop-like particles are thereby obtained, which comprise humid cellulosic fibres coated with a layer of polymer. These particles can be used as an additive to the fibrous stock for papermaking or boardmaking and subsequent making of moulded plates or trays according to the teachings of the invention.

Optionally the fibrous particles may be provided with a double-layer coating of two different polymers. The coating obtained as described above will serve as a foamable inner coating layer of a first polymer in contact with the enclosed humid fibres. An outer, preferably non-foamable outer coating of a second polymer is produced by suspending said singly coated particles in a solution containing said second polymer and an organic solvent. A preferred polymer for the purpose is LDPE with a melt flow rate less than 15 g/10 min at 190° C., and a preferred solvent is decalin. Water is added to the solution to bring about a phase inversion and precipitation of the second polymer onto the singly coated particles. The result is doubly coated drop-like particles, the double-layer polymer coating enclosing the humid cellulosic fibres or bunches of such fibres. The polymers are selected so that when heated the inner coating layer melts and foams as the moisture in the fibres is vaporized, while the outer coating layer remains unmelted and unfoamed. The doubly coated particles with such behaviour are the preferred additive for use in the making of paper or board, as well as in subsequent making of moulded plates or trays according to the teachings of the invention.

Alternatively, singly coated fibrous particles for use in the invention could be produced by extrusion of a melted blend of fibres and polymer. The particles thus produced are elongate, yarn-like and may comprise a plurality of fibres or bundles of fibres embedded in a continuous polymeric phase. The elongate yarn as produced may then be cut into shorter pieces for incorporation in the fibrous stock.

Making of the Paper or Board

A single layer or multilayer paper or board may be produced by use of an ordinary paper or board machine. A fibrous stock for papermaking is prepared, and an amount of the singly or doubly coated drop-like particles are added thereto. The stock with an even distribution of said particles is supplied from a headbox to a forming fabric of the paper or board machine, turned to a fibrous web, and pressed and dried to finished paper or board product. The products include single or double layer papers of a weight of 40 to 130 $g/m^2$ and multilayer boards of a weight of 130 to 500 $g/m^2$. Boards of a weight of 190 $g/m^2$ or more, which are suitable for being turned to trays, are preferred. The density of the products is preferably about 280 $g/dm^3$ or more. In case of a multilayer board the drop-like foamable particles are preferably incorporated in an inner layer only, even if it is possible to have such particles in each layer of a board product.

Foaming of the drop-like polymer coated particles by heating may be performed before the finished paper or board web is reeled into rolls for transport. However, it is preferable to leave the particles unfoamed at this stage, and have them foamed first when the paper or board is moulded into articles such as plates and trays.

The fibrous stock for use in the invention may have an ordinary constitution, that is about 0.2 to 1 wt-% of fibres in an aqueous medium. However, for achieving an even distribution of the drop-like particles it is preferable to apply the well-known foam forming technique, in which fibers are supplied to the forming fabric of the paper or board machine as a foamed dispersion. A surface active agent is incorporated in the stock, and air is blown to produce foam of an air content of about 60 to 70 vol-% or more. The basic technique of foam forming is described e.g. in the publication GB 1 395 757, and WO 2013/160553 discloses a further development with microfibrillated cellulose (MFC) included in the stock. In the practice of the present invention such a foamed stock would receive the drop-like coated particles as an additive before it is fed onto the forming fabric. Use of MFC as a component of the stock is also an option within the metes and bounds of the invention.

Addition of the drop-like coated particles to the fibrous stock is preferably carried out immediately before the paper or board machine headbox by means of flash mixing technique. Equipment for flash mixing under trade mark Trump-Jet is available from Wetend Technologies Ltd.

Moulding of Trays

Production of a moulded tray from the board obtained as described above uses a mould, which has a cavity shaped to accord with the tray that is being produced. The board web may be cut into blanks, which are positioned to face the mould cavity one by one, followed by the moulding step which turns them to trays, or a web may be fed to the moulding tool on a continuous basis, to have the trays separated from each other first after having been moulded.

The moulding operation is preferably carried out by drawing the board against the bottom of the mould cavity by means of vacuum. Heat and moistening are applied to aid in adapting the board to the contours of the mould cavity. Furthermore, heating of the board induces foaming of the polymer coated drop-like particles embedded in the board. The expanding particles are more or less brought into contact with each other and add to the malleability of the board during the moulding operation, thus avoiding the tendency of wrinkling. In case the particles are doubly-coated, melting and foaming occurs in the inner polymer coating layer whereas the outer polymer coating layer is stretched as the foaming inner layer expands but remains solid and unfoamed. Finally the newly moulded tray is cooled and the foamed polymer within the board is solidified in its expanded state.

The finished tray is particularly useful as a package for various foodstuffs. Avoidance of wrinkles on the tray rim flanges allows providing the tray with a heat-sealed lid without risk of leaks and thereby adding to the shelf-life of the package.

Plates as disposable tableware and other moulded paper and board articles covered by the invention may be manufactured by similar techniques merely by varying the shape of the mould cavity as required.

The invention claimed is:

1. A method of manufacturing paper or board, comprising the steps of
    (i) coating pulp fibres and a foaming agent with polymer, to produce polymer-coated foamable particles,
    (ii) incorporating an amount of said particles into a fibrous stock for papermaking,
    (iii) forming a web from said fibrous stock on a forming fabric of a paper or board machine,
    (iv) pressing and drying said web to a paper or board layer, and
    (v) heating said paper or board layer to have the foaming agent contained in the polymer-coated foamable particles to produce vapour or gas, which foams said polymer.

2. The method of claim 1, wherein the foaming agent is moisture, which evaporates and foams the polymer.

3. The method of claim 1, wherein a melt flow rate of the polymer is at least about 15 g/10 min at 190° C.

4. The method of claim 1, wherein the polymer comprises low density polyethylene (LDPE).

5. The method of claim 1, wherein
    at step (i) said polymer-coated foamable particles are provided with a further polymer to form a double-layer coating having an inner layer and an outer layer, a melt viscosity of the polymer of the inner layer being higher than a melt viscosity of the further polymer of the outer layer, and
    at step (v) the polymer of the inner layer is foamed by means of the foaming agent while the further polymer of the outer layer remains substantially unfoamed.

6. The method of claim 1, wherein the pulp fibres in said polymer-coated foamable particles have a length of 1 to 50 mm.

7. The method of claim 1, wherein a share of polymer in said polymer-coated foamable particles is 5 to 65 wt-%.

8. The method of claim 1, wherein said polymer-coated foamable particles are added to the fibrous stock at a headbox of the paper or board machine, by mixing the polymer-coated foamable particles with liquid circulated in the process, to form 5 to 25% of the dry weight of the fibrous stock supplied onto the forming fabric.

9. The method of claim 1, wherein said polymer-coated foamable particles are incorporated in a middle layer of a multilayer board.

10. The method of claim 1, wherein a temperature at step (v) to foam the polymer is about 110 to 150° C.

11. The method of claim 1, wherein the paper or board is provided with a further polymer coating layer on both sides thereof before the heating, which induces foaming in the polymer-coated foamable particles incorporated in the fibrous stock.

12. The method of claim 11, wherein the further polymer used for coating the paper or board has a lower melt viscosity than the polymer of the particles incorporated in the fibrous stock.

13. The method of claim 11, wherein foaming of the polymer is carried out before the newly produced paper or board is reeled.

14. The method of claim 1, wherein a temperature at step (v) to foam the polymer is 115 to 125° C.

15. A method of manufacturing a board article, such as a tray or a plate, from board produced in accordance to step (i) to (iv) in claim 1, comprising the steps of (i) placing the board produced in step (iv) in claim 1 over a mould, which has a recess shaped to accord with the article being produced, (ii) drawing the board against the mould by means of vacuum, (iii) during step (ii), heating the board to induce foaming in the polymer-coated foamable particles incorporated in the board, and (iv) cooling the newly moulded article to solidify the polymer within the board.

16. A method of producing polymer coated particles for use in the method of claim 5, comprising the steps of (i) suspending fibrous cellulosic particles of a length of 1 to 50 mm in a solution containing a foamable first thermoplastic polymer and a first solvent, (ii) precipitating said first thermoplastic polymer onto said fibrous particles by means of added water and phase inversion, to obtain fibrous particles with enclosed humidity and a first polymer coating layer, (iii) suspending the polymer-coated particles obtained at step (ii) in a solution containing a second thermoplastic polymer and a second solvent, said second thermoplastic polymer having a melt viscosity lower than the melt viscosity of said first thermoplastic polymer, and (iv) precipitating said second thermoplastic polymer onto said fibrous particles by means of added water and phase inversion, to obtain fibrous particles with a double-layer polymer coating having an inner first polymer coating layer and an outer second polymer coating layer, in which the inner first polymer coating layer is foamable while the outer second polymer coating layer remains unfoamed.

\* \* \* \* \*